(12) United States Patent
Hornig et al.

(10) Patent No.: US 9,394,597 B2
(45) Date of Patent: Jul. 19, 2016

(54) METHOD FOR THE LOCAL HEAT TREATMENT OF GAS TURBINE BLADES

(75) Inventors: Christian Hornig, Halbe (DE); Jens Weder, Berlin (DE)

(73) Assignee: MTU Aero Engines GmbH, Munich (DE)

( * ) Notice: Subject to any disclaimer, the term of this patent is extended or adjusted under 35 U.S.C. 154(b) by 1185 days.

(21) Appl. No.: 13/391,651

(22) PCT Filed: Aug. 31, 2010

(86) PCT No.: PCT/DE2010/001019
§ 371 (c)(1),
(2), (4) Date: Feb. 22, 2012

(87) PCT Pub. No.: WO2011/026469
PCT Pub. Date: Mar. 10, 2011

(65) Prior Publication Data
US 2012/0156630 A1 Jun. 21, 2012

(30) Foreign Application Priority Data
Sep. 5, 2009 (DE) .......................... 10 2009 040 324

(51) Int. Cl.
*B23Q 3/00* (2006.01)
*C22F 1/10* (2006.01)
*B23P 6/00* (2006.01)
*C21D 9/00* (2006.01)

(52) U.S. Cl.
CPC . *C22F 1/10* (2013.01); *B23P 6/005* (2013.01); *C21D 9/0068* (2013.01); *C21D 2221/00* (2013.01)

(58) Field of Classification Search
CPC ...................................... F01D 5/286

USPC ....................... 269/287; 432/10, 28, 184, 215
See application file for complete search history.

(56) References Cited

U.S. PATENT DOCUMENTS

| 4,664,722 | A |  | 5/1987 | Clinkscales et al. |
| 4,818,833 | A | * | 4/1989 | Formanack ............. F01D 11/12 219/634 |
| 6,490,899 | B2 | * | 12/2002 | Berthelet .................. B24B 1/04 29/90.7 |
| 6,660,110 | B1 |  | 12/2003 | Gayda et al. |
| 7,875,135 | B2 | * | 1/2011 | Kelly ...................... B23P 6/007 148/639 |
| 2002/0124402 | A1 | * | 9/2002 | Berthelet .................. B24B 1/04 29/889.1 |
| 2007/0267109 | A1 | * | 11/2007 | Kelly ...................... B23P 6/007 148/516 |

FOREIGN PATENT DOCUMENTS

| EP | 1 857 217 | | 11/2007 | |
| GB | 2280580 A | * | 2/1995 | ............... H05B 3/06 |

* cited by examiner

*Primary Examiner* — Gregory A Wilson
(74) *Attorney, Agent, or Firm* — Davidson, Davidson & Kappel, LLC

(57) ABSTRACT

A method for heat-treating gas turbine blades, namely for locally heat-treating at least one gas turbine blade in a blade section thereof; a blade root section, which is not to be heat-treated, of the gas turbine blade being positioned in a holding receptacle to prevent an unacceptable heating of the particular blade root section, which is not to be heat-treated, during the heat treatment of the particular blade section. The blade root section of the gas turbine blade is positioned in an interior space in a way that allows a remaining interior space of the holding receptacle, to be filled with a filler material; the holding receptacle, together with the gas turbine blade, being subsequently positioned in a heat treatment chamber to enable the gas turbine blade in the heat treatment chamber to undergo local heat treatment under vacuum.

9 Claims, 2 Drawing Sheets

METHOD FOR THE LOCAL HEAT TREATMENT OF GAS TURBINE BLADES

The present invention relates to a method for heat-treating gas turbine blades. The present invention also relates to a holding receptacle for at least one gas turbine blade for use in the heat treatment of the or each gas turbine.

BACKGROUND

The European Patent Application EP 1 857 217 A1 describes a method for thermally treating gas turbine blades, namely for locally thermally treating a gas turbine blade in a blade section thereof. The local heat treatment of a gas turbine blade in the blade section thereof discussed in the European Patent Application EP 1857 217 A1 provides for a blade root section, which is not to be thermally treated, of the gas turbine blade to be positioned in a fixture to prevent the blade root section, which is not to be thermally treated, from being heated during the heat treatment of the blade section by conveying a cooling medium through the fixture. To this end, the blade root section is positioned in an interior space of the fixture, the contour of the interior space being adapted to the contour of the blade root section.

SUMMARY OF THE INVENTION

It is an object of the present invention to provide a novel method for heat-treating gas turbine blades, as well as a corresponding holding receptacle for at least one gas turbine blade.

The present invention provides for the blade root section, which is not to be heat-treated, of the or each gas turbine blade to be positioned in an interior space of the holding receptacle in a way that allows a remaining interior space of the holding receptacle, that is not entirely taken up by the or each blade root section, to be filled with a filler material; the holding receptacle, together with the or each gas turbine blade, being subsequently positioned in a heat treatment chamber to enable the or each gas turbine blade in the heat treatment chamber to undergo heat treatment.

The method according to the present invention provides for at least one gas turbine blade to be positioned in sections thereof, together with the blade root section, which is not to undergo heat treatment, in an interior space of a holding receptacle, the contour of the interior space not being adapted to the contour of the or each blade root section, so that, upon positioning of the or each blade root section in the interior space of the holding receptacle, an interior space remains which, in accordance with the present invention, is filled with a filler material.

The filler material is used for storing and thus for absorbing heat in order to prevent an unacceptable heating of the or each blade root section during the heat treatment of the or each gas turbine blade in the particular blade section. Accordingly, the filler material functions as a heat sink and delays the heating of the or each blade root section. The entire holding receptacle, together with the or each gas turbine blade, is positioned in a heat treatment chamber for heat treatment, the heat treatment being performed in the heat treatment chamber under vacuum.

The holding receptacle according to the present invention for at least one gas turbine blade for use in a heat treatment of the or each gas turbine blade.

BRIEF DESCRIPTION OF THE DRAWINGS

Preferred embodiments of the present invention are derived from the dependent claims and from the following description. Non-limiting exemplary embodiments of the present invention are described in greater detail with reference to the drawing, whose figures show:

DETAILED DESCRIPTION

The present invention relates to the heat treatment of gas turbine blades, namely to the local heat treatment of gas turbine blades in one blade section thereof.

Figure 1:
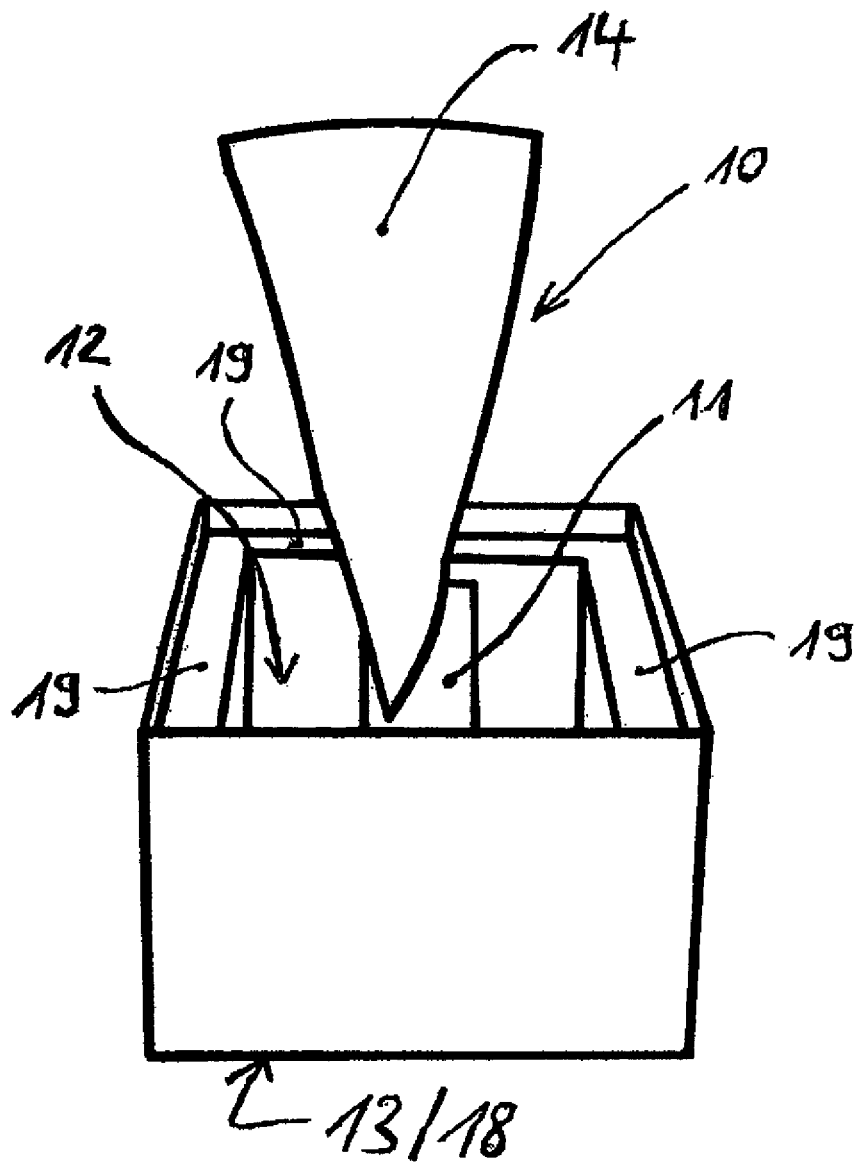
FIG. 1 a perspective view of a holding receptacle for a gas turbine blade for the heat treatment thereof, together with a gas turbine blade.
Figure 2:
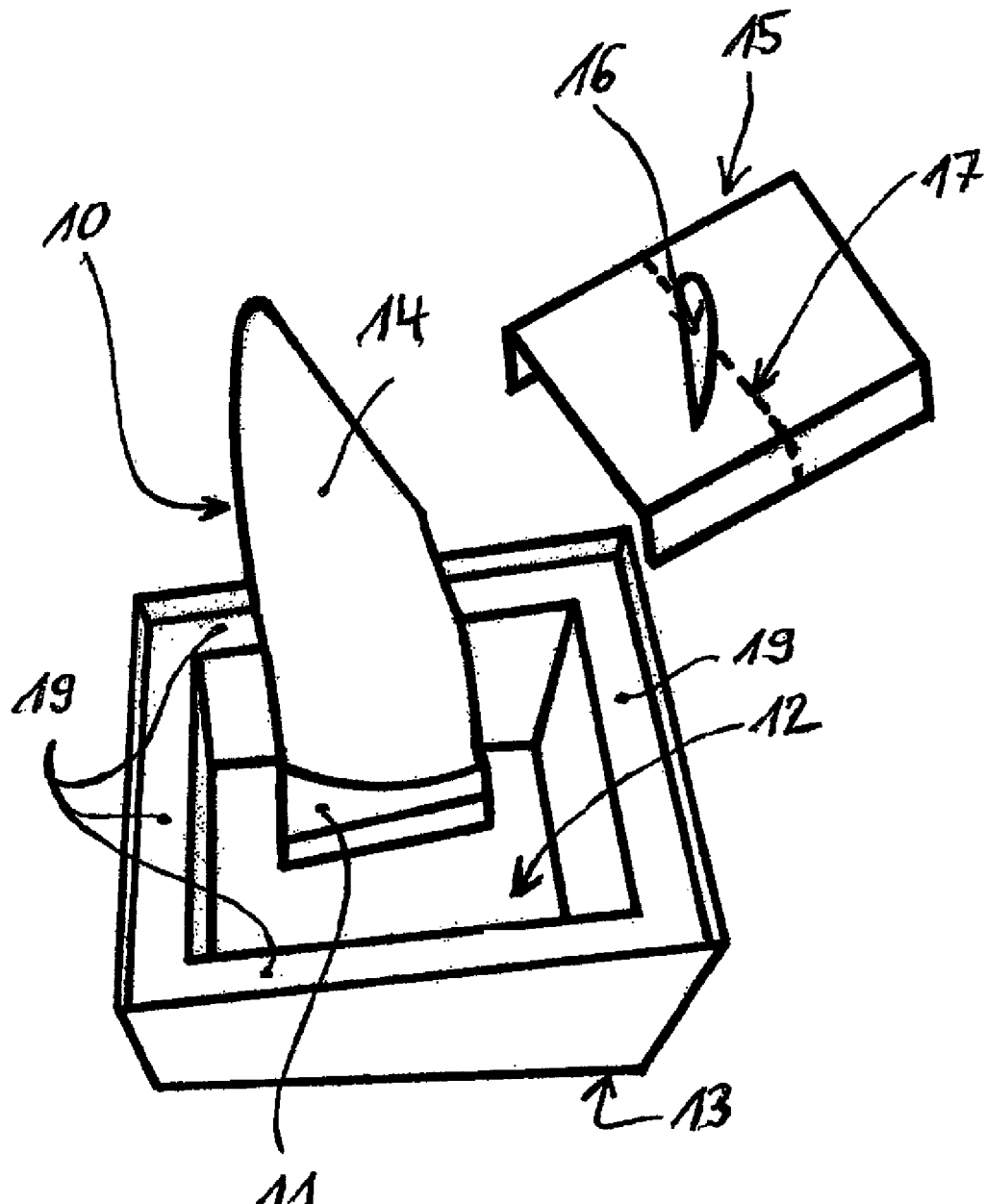
FIG. 2 another perspective view of the configuration according to FIG. 1, together with a cover for the holding receptacle.

In accordance with the exemplary embodiment illustrated in FIGS. 1 and 2, a gas turbine blade 10 is positioned together with a blade root section 11, which is not to undergo heat treatment, in an interior space 12 of a holding receptacle 13 for local heat treatment thereof; a blade section 14, which is to be heat-treated, of gas turbine blade 10 projecting out of interior space 12 of holding receptacle 13.

Interior space 12 of holding receptacle 13 is not adapted to the contour of blade root section 11 positioned in the same, so that, following positioning of blade root section 11 of gas turbine blade 10 in interior space 12 of holding receptacle 13, a free space of interior space 12 remains that is filled with a filler material (not shown in FIGS. 1 and 2).

In this case, the entire remaining interior space 12 of holding receptacle 13 is preferably filled with the filler material, so that the filler material does not make contact with blade root section 11, which is not to be heat-treated, of gas turbine blade 10.

Upon positioning of gas turbine blade 10, together with blade root section 11, in interior space 12 of holding receptacle 13, and upon filling of interior space 12 with the filler material, interior space 12 is preferably covered at a top side of holding receptacle 13 by a cover 15 through which extends blade section 14, which is to be heat-treated, of gas turbine blade 10.

For this purpose, as shown in FIG. 2, cover 15 features a recess 16 through which extends blade section 14, which is to be heat-treated. The contour of recess 16 is adapted to the contour of blade section 14. Cover 15 preferably has a two-part design to facilitate the positioning thereof onto holding receptacle 13; one separation plane 17 of cover 15 extending through recess 16.

To thermally treat gas turbine blade 10 in the region of blade 14 thereof, entire holding receptacle 13, together with gas turbine blade 10, is positioned in a heat treatment chamber, preferably in a vacuum furnace, to enable gas turbine blade 10 to undergo heat treatment in the region of blade section 14 thereof in the heat treatment chamber under vacuum.

By positioning blade root section 11 of gas turbine blade 10 in interior space 12 of holding receptacle 13 and surrounding the same with filler material, a heating of gas turbine blade 10 in the region of blade root section 11, which is not to be heat-treated, is effectively delayed or prevented.

The filler material used to fill remaining interior space 12 of holding receptacle 13 is preferably composed of solid bodies made of a material that does not react with the material of gas turbine blade 10.

Gas turbine blade 10 is preferably manufactured from a titanium alloy. Therefore, solid bodies of steel may be used. As solid bodies, steel spheres or steel powder are/is preferably suited. The amount of filler material used determines the delay in the heating of blade root section 11 which is not to be heat-treated. Gas turbine blade 10 may also be manufactured from other materials. However, the filler material must not react with the material of gas turbine blade 10, in particular during the heat treatment.

The solid bodies are preferably fabricated of a material that has a specific thermal capacity of between 390 and 520 $J*kg^{-1}*K^{-1}$, a thermal conductivity of between 50 and 400 $W*m^{-1}*K^{-1}$, and a specific weight of between 70000 and 90000 $N*m^{-3}$.

Besides already mentioned cover 15, holding receptacle 13, which provides interior space 12 for accommodating blade root section 11 of a gas turbine blade 10, which is to be partially heat-treated, also features a housing 18 which delimits interior space 12 and, in the illustrated exemplary embodiment of FIGS. 1 and 2, has a double-walled design including an insulating layer in the area of side walls 19. The insulating layer reduces the heat input into holding receptacle 13.

One advantageous embodiment of the present invention may provide for holding receptacle 13 to be traversed by the flow of a cooling medium in the region of double-walled side walls 19 in order to additionally dissipate the heat stored in the filler material to the outside.

It is likewise possible for holding receptacle 13 to be filled with an insulating material in the region of double-walled side walls 19. The insulating material then delays the transfer of heat from the housing wall via the filler material into the blade root of the or each gas turbine blade to be locally heat-treated.

Gas turbine blades undergo heat treatment in sections, respectively locally, particularly following repair in the region of blade 14 thereof. Thus, damaged portions of blade 14 are typically removed during repair of a gas turbine blade 10 in the region of blade 14 thereof and restored by welding on a replacement part; the welded region of blade 14 then undergoing a local heat treatment. The present invention makes it possible for entire gas turbine blade 10, together with holding receptacle 13, to be positioned in a conventional heat treatment chamber, in particular in a conventional vacuum furnace, to locally heat-treat a gas turbine blade 10; the heating and thus heat treatment of gas turbine blade 10 in blade root section 11 being prevented because the filler material introduced into interior space 12 of receptacle 13 absorbs heat and thereby prevents an unacceptably high heating of blade root section 11 of gas turbine blade 10.

The invention claimed is:

1. A method for locally heat-treating at least one gas turbine blade having a blade section and a blade root section in the blade section, the blade root section not to be heat-treated, the gas turbine blade being positioned in a holding receptacle to prevent an unacceptable heating of the blade root section during heat treatment of the blade section, the method comprising;
    positioning the blade root section of the gas turbine blade in an interior space of the holding receptacle in a way that allows a remaining interior space of the holding receptacle, that is not entirely taken up by the blade root section, to be filled with a filler material; and
    subsequently positioning the holding receptacle, together with the gas turbine blade, in a heat treatment chamber to enable the turbine blade in the heat treatment chamber to undergo heat treatment;
    wherein the remaining interior space of the holding receptacle, that is not entirely taken up by the blade root section, is filled with solid bodies in the form of metal spheres and/or with metal powder.

2. The method as recited in claim 1 wherein the gas turbine blade in the heat treatment chamber is locally heat-treated under vacuum.

3. The method as recited in claim 1 wherein the remaining interior space of the holding receptacle is filled with solid bodies whose material has a specific thermal capacity of between 390 and 520 $J*kg-1*K-1$.

4. The method as recited in claim 1 wherein the solid bodies have a thermal capacity of between 50 and 400 $W*m-1*K-1$.

5. The method as recited in claim 1 wherein the solid bodies have a specific weight of between 70000 and 90000 $N*m-3$.

6. The method as recited in claim 1 wherein solid bodies do not react with the material of the gas turbine blade during the heat treatment.

7. The method as recited in claim 1 wherein the metal spheres and/or metal powder include steel spheres and/or steel powder.

8. The method as recited in claim 1 wherein the holding receptacle, together with the gas turbine blade, is positioned in a vacuum furnace for heat treatment.

9. The method as recited in claim 1 wherein a double-walled region of a housing delimiting the interior space of the holding receptacle is either filled with an insulating material or is traversed by the flow of a cooling medium.

\* \* \* \* \*